(12) United States Patent
Robinson (10) Patent No.: US 7,692,861 B2
(45) Date of Patent: Apr. 6, 2010

(54) ILLUMINATION SYSTEMS

(75) Inventor: Michael G Robinson, Boulder, CO (US)

(73) Assignee: Real D, Beverly Hills, CA (US)

( * ) Notice: Subject to any disclaimer, the term of this patent is extended or adjusted under 35 U.S.C. 154(b) by 327 days.

(21) Appl. No.: 11/160,732

(22) Filed: Jul. 6, 2005

(65) Prior Publication Data

US 2006/0007538 A1    Jan. 12, 2006

Related U.S. Application Data

(60) Provisional application No. 60/586,089, filed on Jul. 6, 2004.

(51) Int. Cl.
*G02B 5/30* (2006.01)
*G02B 27/28* (2006.01)

(52) U.S. Cl. ............... 359/495; 359/497; 359/900; 362/19

(58) Field of Classification Search .......... 359/487, 359/495, 497, 900; 353/20; 362/19
See application file for complete search history.

(56) References Cited

U.S. PATENT DOCUMENTS

| | | | | |
|---|---|---|---|---|
| 2,958,258 A * | 11/1960 | Kelly | ............. | 348/758 |
| 3,497,283 A * | 2/1970 | Law | ............. | 359/497 |
| 3,704,061 A * | 11/1972 | Travis | ............. | 359/498 |
| 3,767,290 A * | 10/1973 | Lang et al. | ............. | 359/490 |
| 4,256,368 A * | 3/1981 | Task | ............. | 359/501 |
| 4,425,028 A * | 1/1984 | Gagnon et al. | ............. | 359/246 |
| 4,461,542 A * | 7/1984 | Gagnon | ............. | 349/8 |
| 5,067,799 A * | 11/1991 | Gold et al. | ............. | 359/490 |
| 5,074,645 A * | 12/1991 | Gold et al. | ............. | 359/465 |
| 5,132,826 A * | 7/1992 | Johnson et al. | ............. | 349/18 |
| 5,223,975 A * | 6/1993 | Naganuma et al. | ............. | 359/487 |
| 5,245,472 A | 9/1993 | Hegg | | |
| 5,382,790 A * | 1/1995 | Robillard et al. | ............. | 250/216 |
| 5,513,023 A * | 4/1996 | Fritz et al. | ............. | 349/9 |
| 5,929,946 A * | 7/1999 | Sharp et al. | ............. | 349/18 |
| 5,953,083 A | 9/1999 | Sharp | | |
| 6,042,234 A | 3/2000 | Itoh | | |
| 6,108,132 A * | 8/2000 | Itoh | ............. | 359/487 |
| 6,243,198 B1 * | 6/2001 | Sedlmayr | ............. | 359/483 |
| 6,309,071 B1 | 10/2001 | Huang et al. | | |
| 6,545,804 B2 * | 4/2003 | Chuang | ............. | 359/495 |
| 6,650,377 B2 * | 11/2003 | Robinson et al. | ............. | 349/9 |
| 6,726,329 B2 * | 4/2004 | Li et al. | ............. | 353/20 |
| 6,758,565 B1 * | 7/2004 | Cobb et al. | ............. | 353/34 |
| 6,816,309 B2 * | 11/2004 | Chen et al. | ............. | 359/498 |

(Continued)

OTHER PUBLICATIONS

International search report and written opinion for co-pending PCT application PCT/US05/23841.

(Continued)

*Primary Examiner*—Ricky D Shafer
(74) *Attorney, Agent, or Firm*—Baker & McKenzie LLP (57) ABSTRACT

Described are illumination systems whereby light spectra from multiple LEDs of various colors can be combined and polarized with minimal components, while substantially reducing the losses for the combining and polarizing. The described systems and methods use polarizing beam splitters (PBSs) with retarder stack filters to combine color and split polarization for mixed light beams in one step, and to ultimately align the polarizations of the several colored light beams.

20 Claims, 11 Drawing Sheets

U.S. PATENT DOCUMENTS

| | | |
|---|---|---|
| 6,937,377 B1 * | 8/2005 | Brown et al. ................. 359/237 |
| 7,072,096 B2 | 7/2006 | Holman et al. |
| 7,325,957 B2 * | 2/2008 | Morejon et al. ............. 362/555 |
| 2002/0191235 A1 | 12/2002 | O'Connor |
| 2003/0081180 A1 | 5/2003 | Suzuki |
| 2005/0200812 A1 * | 9/2005 | Sakata et al. .................. 353/20 |
| 2005/0259224 A1 * | 11/2005 | Lee et al. ...................... 353/31 |

OTHER PUBLICATIONS

Supplementary European Search Report of EP05768605 dated Sep. 14, 2009.

* cited by examiner

ILLUMINATION SYSTEMS

CROSS-REFERENCE TO RELATED APPLICATIONS

This application claims the benefit of U.S. Provisional Application Ser. No. 60/586,089, filed on Jul. 6, 2004, and entitled "Illumination System," which is commonly assigned with the present application and incorporated herein by reference in its entirety for all purposes.

TECHNICAL FIELD

Disclosed embodiments relate generally to illumination systems incorporating different colored light sources, such as laser light sources or light emitting diodes (LEDs). Generally disclosed applications herein relate to polarization-sensitive projection of images from micro-display optical modulators. Specific systems include head-mounted, head-up, rear-projection, and front-projection displays.

BACKGROUND

Due to their relatively low power consumption and long lives, LEDs are desirable light sources. Laser light sources are at times desirable because of their long lives, high intensity, and superior collimation. LEDs and laser light sources are narrow-band light sources, or in other words, provide colored light. While these light sources provide unpolarized light, there are many applications for which polarized light is desired. LCDs, for example, operate on polarized light, and so to use one of these light sources to illuminate an LCD-based display, it would be necessary to convert the light from these sources to polarized light. One approach for generating polarized light from an unpolarized source is to use a filtering polarizer, but that approach also filters out approximately 50% of the light energy. Further, oftentimes a "white" light source is desired, but LEDs instead generate specific colors—e.g., red, green, blue, and yellow.

SUMMARY

Disclosed in this application is a technique whereby the light spectra from multiple LEDs of varying colors can be combined and polarized with minimal components, while substantially reducing the losses during combining and polarizing. The described techniques use polarizing beam splitters (PBSs) with retarder stack filters to combine color and convert polarization for mixed component light beams in one step, and to ultimately align the polarizations of the several colored light beams.

Further disclosed is a method and apparatus using a combination of polarization sensitive beam splitters (PBSs) in conjunction with polarization color selective filters or retarder stack filters to accomplish the tasks of color combination and polarization conversion in an integrated illumination system consisting of separate different colored sources. Conceptually, the method physically separates colored beams emanating from two or more differently colored sources into orthogonal polarization states with a single PBS. The orthogonal polarized beams of the different colors are then manipulated with retarder stack filters to form uniformly polarized beams that are combined optically. The complementary operations of combining colors and polarizations allow compact and efficient systems to be realized. Efficient optical systems exhibit both low loss and minimal optical extent in the final illuminating beam. The specific embodiments include collimating optics required for practical systems.

This approach has advantages over approaches using only dichroic filters, because dichroic filter systems require that the colors be split without regard to polarization, and then separately require either polarization filtering or polarization conversion. The dichroic approach does not generally provide for the splitting and recombining of colors and polarization components back into a single combined beam. In the all-dichroic approach, a larger beam of aligned and commonly polarized light is typically formed using two steps; larger beams are of course undesirable from a system-design standpoint.

Additionally, the architectures described here are designed in varying degrees to spatially contain the modulated light beams. Although much of this write-up will use LEDs as the exemplary unpolarized, colored light sources, the techniques applied could be used for the combination and/or polarization of any multiple, colored light sources. Possible uses of the illumination systems described in this application include head-up displays or other projection systems and light illuminators for direct-view LCDs.

DETAILED DESCRIPTION OF THE PREFERRED EMBODIMENTS

Figure 1:
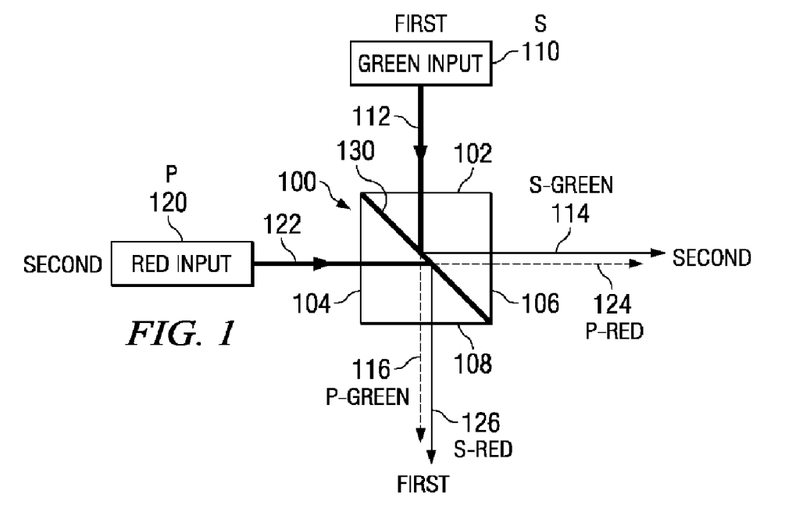
FIG. 1 is a block diagram illustrating the use of a single PBS to create orthogonal polarized light from two different colored light sources into two physically separate mixed color and polarization output beams.

FIG. 1 illustrates a polarization-separating unit 100 embodied as a single PBS element 100. Also shown are a first light source 110 and a second light source 120. The PBS 100 accepts light represented by line 112 from the first light source 110 and light represented by line 122 from the second light source 120. In the present embodiment, the light 112 from the first light source 110 is green and the light 122 from the second light source 120 is red. However, these colors are used only as examples, and are not intended to be limiting. That is, the light sources 110, 120 can be selected that emit any color of light. The PBS 100 acts to separate each beam 112, 122 independently into orthogonal polarized states. In the PBS 100, that component of light having its electric field substantially orthogonal to the plane of incidence (conventionally termed s-polarization) becomes reflected by the surface 130, while that component of the light having its electric field within the plane of incidence (p-polarization) passes through the surface 130. Light beams 112, 122 from the different colored sources 110, 120 may be accepted through adjacent ports 102, 104, respectively, and exit via adjacent ports 106, 108 with mixed color and polarization. As shown, s-polarized green light 114 and p-polarized red light 124 exit through port 106, while p-polarized green light 116 and s-polarized red light 126 exit through port 108. Thus, the system shown in the figure accomplishes the two tasks of combining color and separating polarization with a single beam-splitting element 100.

Figure 2:
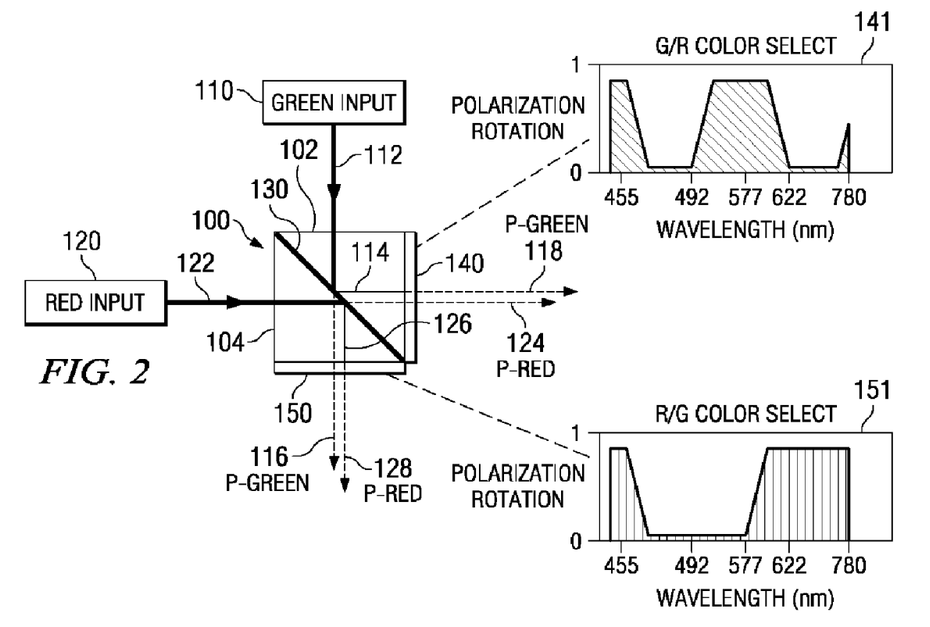
FIG. 2 is a block diagram of an optical system with two polarization color selective filters attached to the two outputs of the single PBS of FIG. 1 to unify the polarization states of the two output beams according to the illustrated wavelength filter spectra shown.

FIG. 2 illustrates an architecture in which two color selective filters 140, 150 are incorporated into the system of FIG. 1, whereby the new architecture acts to create two mixed beams of similar polarization (118 and 124, 116 and 128). The color selective filters 140, 150 can be commercially available filters such as ColorSelect® filters manufactured by ColorLink®, which act to selectively rotate polarization (or not) according to the wavelength of the incident light. Such filters are discussed in commonly owned U.S. Pat. No. 5,953,083 entitled "Retarder stacks for polarizing a first color spectrum along a first axis and a second color spectrum along a second axis," filed May 8, 1997, which is incorporated herein by reference in its entirety for all purposes. As shown in the figure, the filter 140 is a green/red filter that transmits the p-polarized red light 124, substantially without affecting its polarization, and converts the s-polarized green light 114 substantially to p-polarized green light 118. Likewise, the filter 150 is a red/green filter that transmits the p-polarized green light 116, substantially without affecting its polarization, and converts the s-polarized red light 126 to p-polarized red light 128. Recombining the beams (118 and 124, 116 and 128) from the filters 140, 150 may be accomplished by conventional passive optical manipulation as described in subsequent embodiments. The graph elements 141, 151 show the polarization response function of the filters 140, 150, respectively. Thus, the graph 141, 151 indicates the polarization rotation for each of the filters 140, 150 relative to wavelength. Graph 141 shows that the green polarization is rotated by 90 degrees, whereas the other wavelengths pass through the filter substantially unrotated. Graph 151 shows that the red polarization is rotated by 90 degrees, whereas the other wavelengths pass through the filter substantially unrotated.

Figure 3:
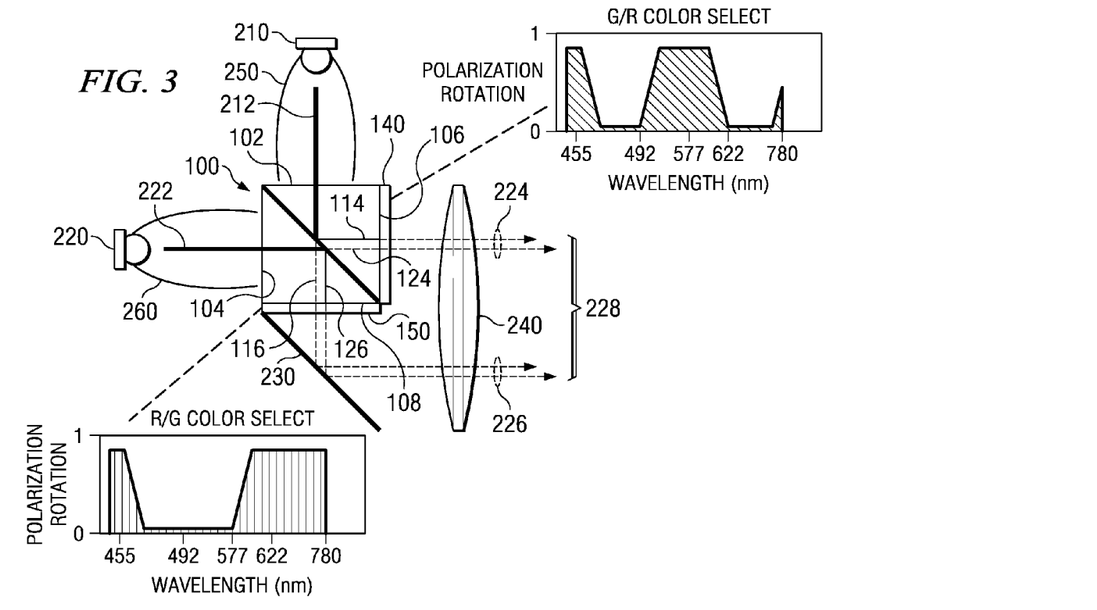
FIG. 3 illustrates a first embodiment of using two different colored LEDs and a single PBS for combining color and converting polarization in an illumination system.

FIG. 3 illustrates a first embodiment of a polarization conversion and color combination system that includes two different colored LED sources 210, 220 or other colored light sources, whose respective outputs 212, 222 are both combined in color and separated in polarization with a single PBS 100. Polarization color selective filters (CSFs) 140, 150 at the two outputs 106, 108 of the PBS 100 create a light beam with a single polarization state at each of the outputs 106, 108. A reflecting mirror element 230 creates parallel propagating beams 224, 226, which are combined with a lens 240 to form a single illumination path 228. Light outputs 212, 222 from the colored light sources 210, 220 may be homogenized by collimation elements (reflective, refractive, or other collimation elements) 250, 260. In a preferred embodiment, the light outputs 212, 222 generate square outputs of light along with a certain divergence as they enter the two ports 102, 104 of the PBS 100. The PBS 100 then separates the polarization states of the two components yielding two beams of mixed polarization (114 and 124, 116 and 126) as described above. The retarder stack filters 140, 150 then align the polarizations of the different colored beams based on the general polarization response principle as previously described to provide mixed colored light beams 224, 226 with a single polarization state in both output ports 106, 108.

One of the advantages of the present illumination system is realized by reducing separation of the output beams 212, 222 through optical collimation 250, 260 and design. Doing so may decrease the optical extent of the source and provide an illumination system that can approach the constant brightness requirements (ideal factor of 2.0). This polarization conversion and color combination system approach can also be extended to include more colored LEDs as illustrated in subsequent figures and embodiments.

Figure 4A:
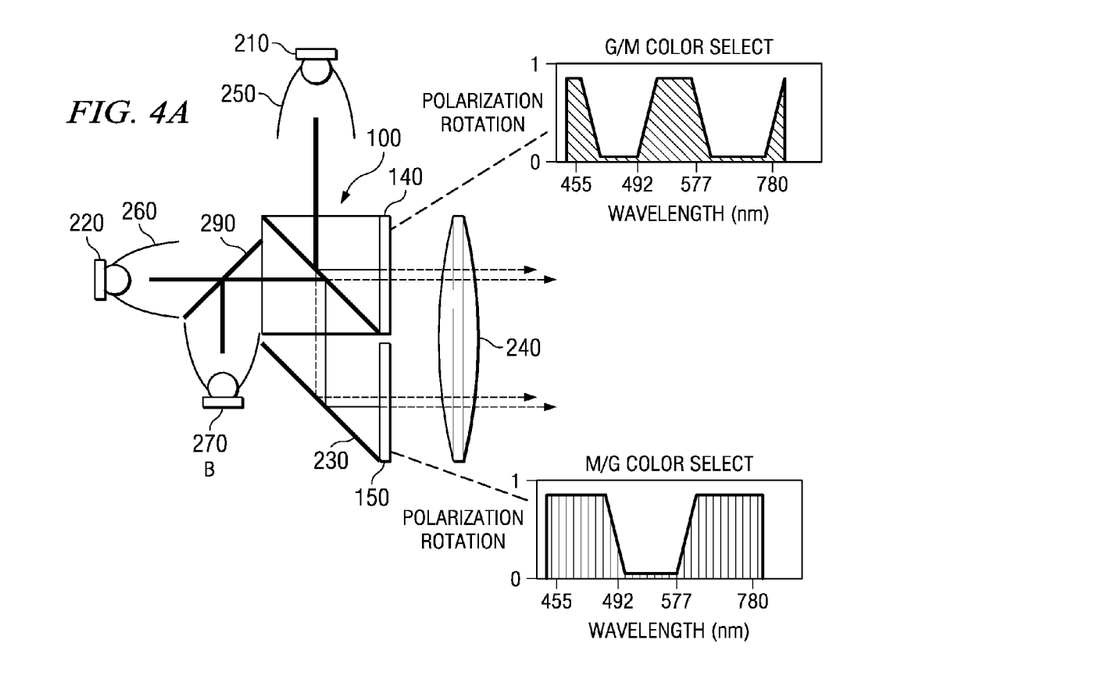
FIGS. 4A-4B illustrate three- and four-color illumination system embodiments, respectively.
Figure 4B:
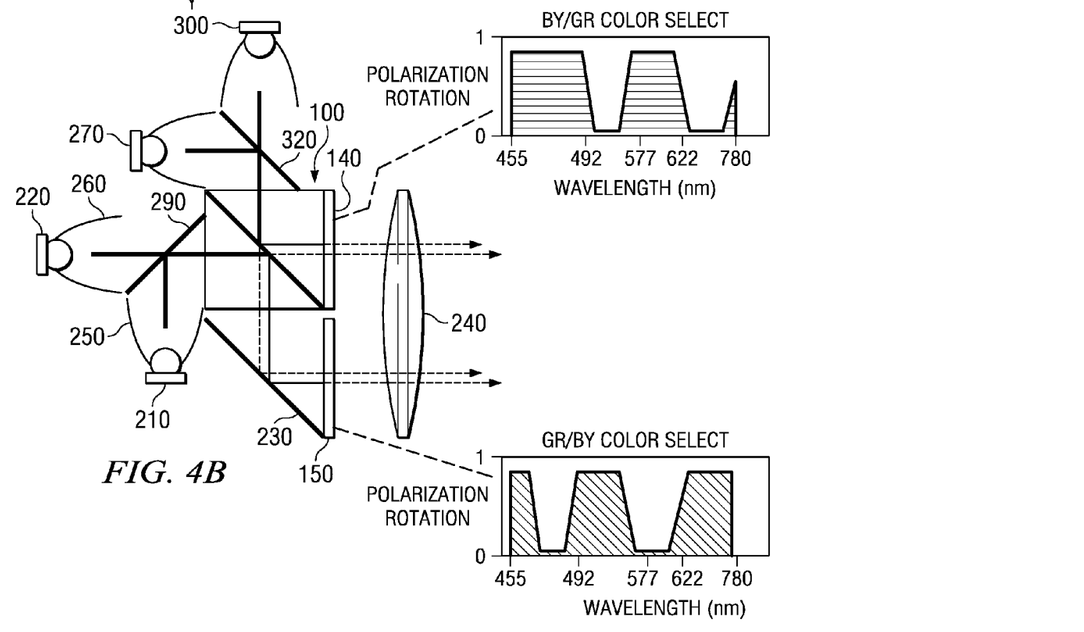

FIGS. 4A-4B illustrate two embodiments that respectively employ three- and four-colored LEDs. The embodiment shown in FIG. 4A includes an additional LED 270 for emitting blue light. The light from the LED 270 may be combined with light from the LED 220 using a dichroic mirror 290 or other optical elements. In this embodiment, filters 140, 150 are as described above, except that polarization color selective filter 140 is a green/magenta filter and polarization color selective filter 150 is a magenta/green filter. The filters 140, 150 operate under the same general polarization response principle as previously described, except with three colors. The embodiment shown in FIG. 4B further includes an additional LED 300 for emitting yellow light. The light from the LED 300 is combined with light from the LED 270 using a dichroic mirror 320, while the dichroic mirror 290 combines light from the LED 210 and the LED 220. In this embodiment, filters 140, 150 are as described above, except that polarization color selective filter 140 is a blue yellow/green red filter and polarization color selective filter 150 is a green red/blue yellow filter. The filters 140, 150 operate under the same general polarization response principle as previously described, except with four colors. The systems shown in FIGS. 4A-4B represent an extension of the basic polarization conversion and color combination system shown in FIG. 3 using substantially polarization independent dichroic color combining elements (e.g., dichroic mirrors 290, 320) to combine light from different colored LEDs prior to entering the PBS 100.

Figure 5:
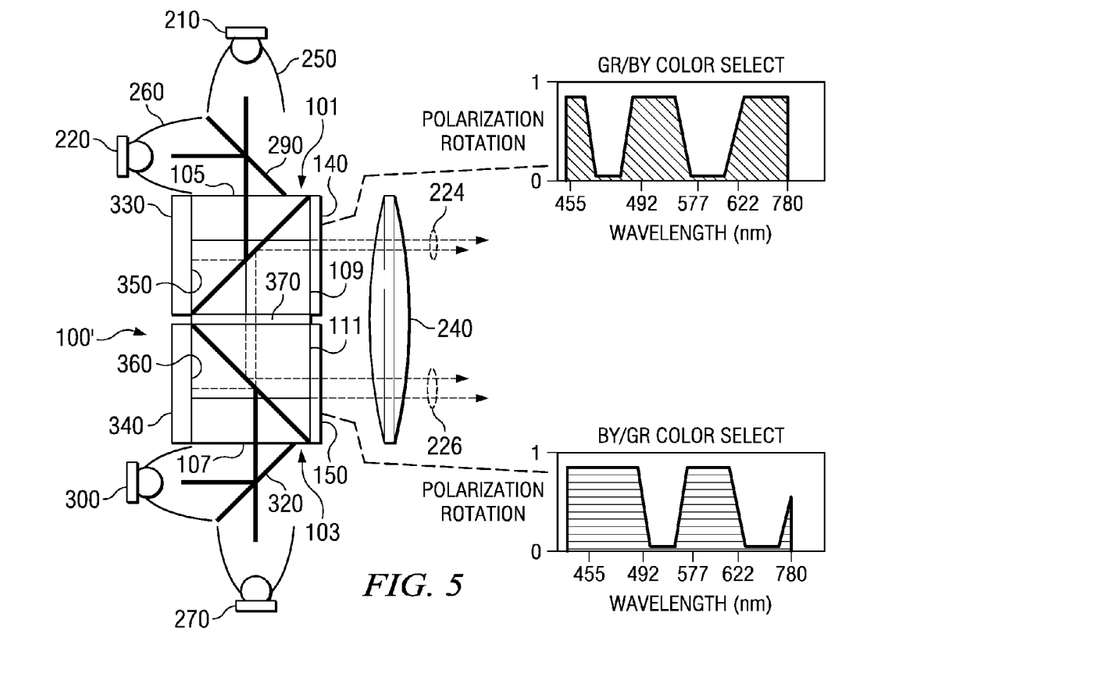
FIG. 5 illustrates a four-color illumination system embodiment with dual PBS elements.

FIG. 5 illustrates an embodiment including an alternative polarization separating unit 100' embodied as dual PBS elements 101, 103. In this embodiment, filters 140, 150 are as described above, except that polarization color selective filter 140 is a green red/blue yellow filter and polarization color selective filter 150 is a blue yellow/green red filter. The filters 140, 150 operate under the same general polarization response principle as previously described. Additionally, mirrors 330, 340 are used to make the optical path between the input faces 105, 107 of the two PBS elements 101, 103 and their final output faces 109, 111 equivalent for all different colored and polarized light. Also, a first quarter-wave plate 350 is provided between the mirror 330 and the PBS 101, a second quarter-wave plate 360 is provided between the mirror 340 and the PBS 103, and a half-wave plate 370 is provided between the two PBSs 101, 103. In this manner, the output lens element 240 images equivalent optical planes for each source, allowing potentially more uniform and efficient combination of the beams.

Figure 6:
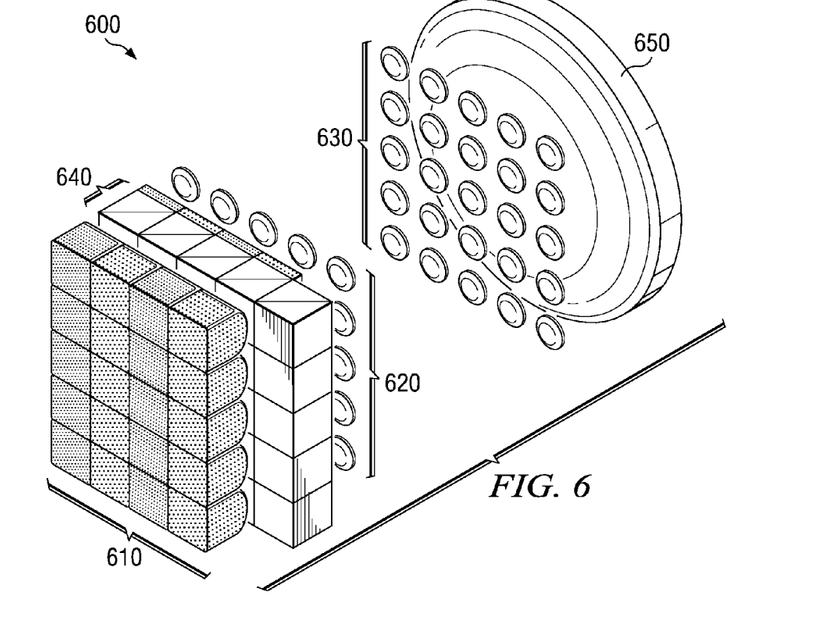
FIG. 6 illustrates a two-color illumination architecture with arrays of LEDs, PBSs, filters, and lenses.

FIG. 6 illustrates a three-dimensional view of an illumination architecture 600 implementing some of the preceding concepts with arrays 610 of red and green LEDs. The LED sources 610 emit light in sub-beamlets, and the various optical components 620, 630, 640 act on these sub-beamlets before ultimately combining them together with a combining lens 650. In this example, the array 610 has 20 LEDs—10 green and 10 red. Each of the LEDs has its own lens, which can be used along with the illustrated fly's eye lens arrays 620, 630 for homogenizing the light source 610. The LED lenses could be a standard LED lens design or it could be customized to achieve a certain focusing effect according to design needs. These LED lenses are adjacent to and aligned with a linear PBS array 640, which will separate the sub-beamlets from each of the LEDs into their p- and s-polarized components. An advantage of using an array of LEDs 610 is that it helps to mitigate thermal issues that would otherwise be associated with operating LEDs in a high-intensity environment. Although 20 LEDs are shown, 40 might be more effective from a thermal dissipation standpoint, but 12 or 16 or some other size array 610 could also be used according to design considerations.

Figure 7:
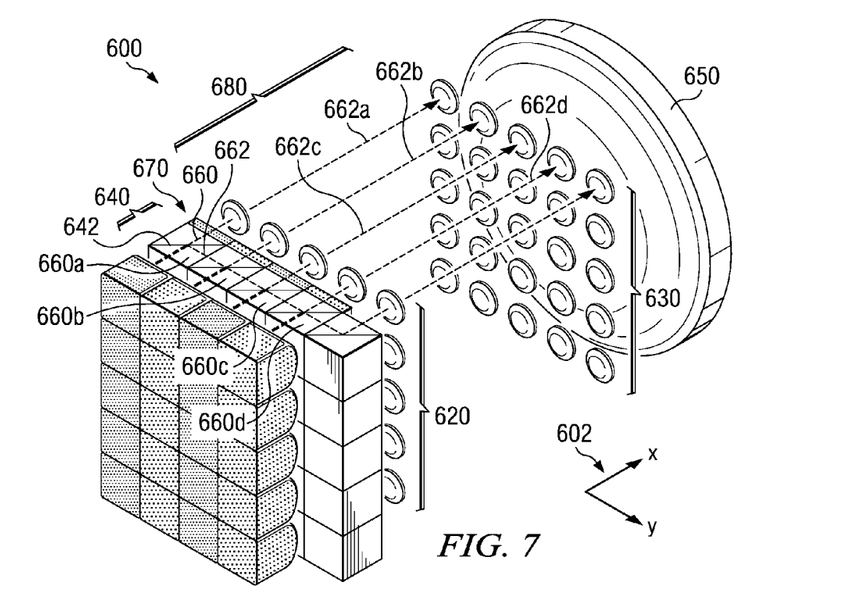
FIG. 7 illustrates some of the polarization physics behind the architecture of FIG. 6.

FIG. 7 illustrates some of the physics behind the architecture 600 of FIG. 6 whereby s-polarized components 660 are initially reflected by the PBS faces 642 along a horizontal direction (y-axis 602), and then reflected along a parallel direction (x-axis 602) in a track adjacent to the p-polarized components 662 along an adjacent column of the linear PBS array 640. Further, alternating column stripes of retarder stack filters 670 may be provided to align the polarization of the reflected (s-polarized) beams 660 with the transmitted (p-polarized) beams 662 through the linear PBS array 640. The retarder stacks 670 rotate the polarization of one spectrum of light while substantially leaving the other spectrum unaffected. The stacks 670 may also be alternated to determine which spectrum is rotated and which remain.

The light beams 680 are commonly p-polarized by (a) passing the p-polarized red light 662a through the first-column retarder stack 670 unaffected, (b) by rotating the s-polarized red light reflected from the first-column 660a through the second-column retarder stack 670 while leaving the p-polarized green light 662b unaffected, (c) by rotating the s-polarized green light reflected from the second-column 660b through the third-column retarder stack 670 while leaving the p-polarized red light 662c unaffected, (d) by rotating the s-polarized red light reflected from the third-column 660c through the fourth-column retarder stack 670 while leaving the p-polarized green light 662d unaffected, and (e) by rotating the s-polarized green light reflected from the fourth column 660d through the fifth-column retarder stack 670. Similarly, the light beams 680 may also be commonly s-polarized.

The two sets of fly's eye lenses 620, 630 are laid out in an array for homogenizing the light input, with a lens corresponding to each LED source. Each lens receives light from the adjacent red and green LEDs, and accordingly a fifth column of lenses 620, 630 is provided to receive the reflected s-polarized green light 660d from the fourth column of LEDs. Similarly, the first column of lenses 620, 630 only receives the p-polarized red light 662a, since there is no green column of LEDs adjacent to the left of the red LEDs.

A preferred embodiment is to have a lens at each LED 610 made from its encapsulation plastic at directing light through the PBS 640 and the filter elements 670 without causing overlap, and would eventually provide square outputs of light at a sensible distance from the illuminating source. At the same time, another set of LEDs 610 would do the same and the square outputs of light it produces would be on top of the previous one, requiring slight angle deviation in its lens cover. Unfortunately when so much optical power or bending of light is demanded of a single surface, the quality of the imaging may decrease. Accordingly, the present application describes multiple ways of designing these systems and architectures using various configurations with (or without) additional lenses and/or other optical components.

Several of the described embodiments, including the one shown in FIG. 6, used a pair of lens arrays 620, 630 and a combining lens 650. Each element from the first lens array 620 acts to squeeze the light more than the LED lens, so that you get a localized spot of light at approximately its focal length (depending on the collimation of the original LED lens). An array of spots may be produced by an array of lenses 620, 630. Each element of the second array 630 is preferably placed at each spot for imaging each element of the first array 620 at infinity. If the first lens array 620 is made up of rectangular elements, then the images at infinity will be rectangular, which is convenient for illuminating video panels. The resulting infinitely large rectangular images are offset at infinity by the separation of the optical elements of the similar lens arrays, which is negligible in comparison with the image size. The combining lens 650 then maps these superimposed images onto its focal plane with a size proportional to its focal length. The offsets are similarly de-magnified thereby maintaining the superposition of all rectangular images. A single lens is preferred at combining the images at the focal length of the final lens into a sensible size and distance.

For the above approaches and for the approaches described below, it is also possible to rearrange the various elements to achieve different design goals. For example, the first fly's eye lens 620 could be placed between the LED array 610 and the PBS array 640, which is an advantageous arrangement for handling certain second-order effects.

In other embodiments, the arrays of fly's eye lenses 620, 630 or the single combining lens 650 may not be necessary. In other words, the LED lenses on the LED sources may be the only optical component to image the light at infinity. Further embodiments described below illustrate other approaches for homogenizing the light with fewer components.

Figure 8:
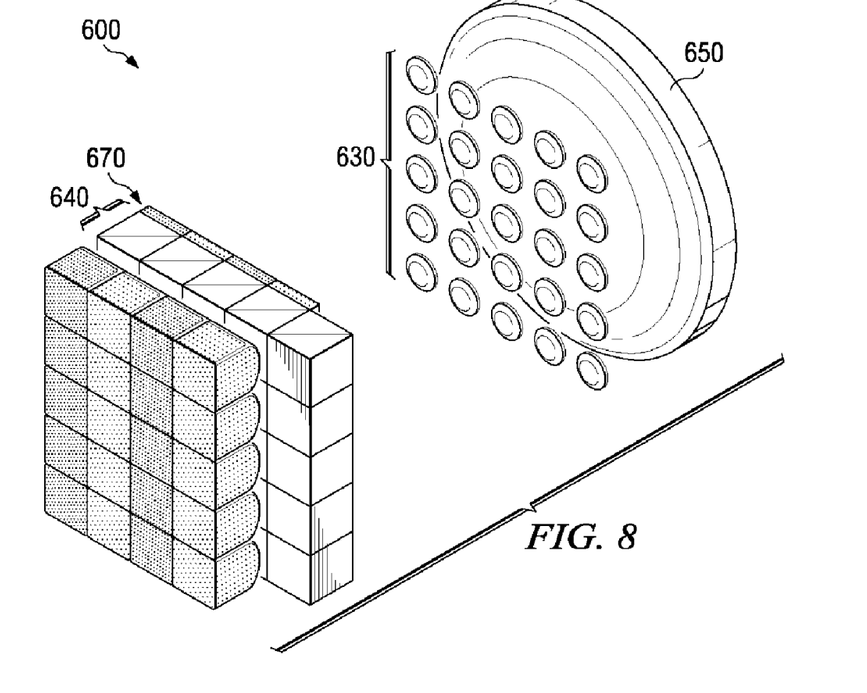
FIG. 8 illustrates the architecture of FIG. 6 with only one set of fly's eye lens.

FIG. 8 illustrates the illumination architecture 600 of FIG. 6 without the first set of fly's eye lens 620. This system relies on the integrated LED lenses to image to the single set of fly's eye lens 630, after passing through the PBS array 640 and the retarder stacks 670.

Figure 9:
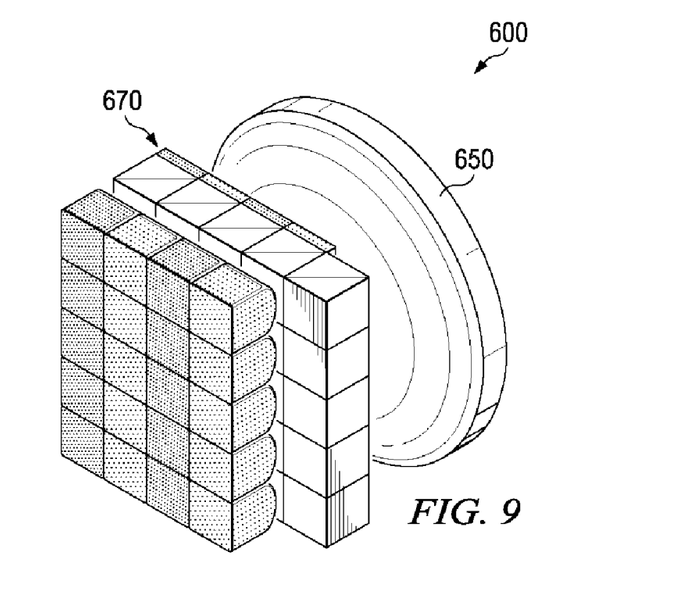
FIG. 9 illustrates the architecture of FIG. 6 with no fly's eye lenses.

FIG. 9 illustrates the illumination architecture 600 of FIG. 6 without any fly's eye lenses 620, 630, and positions the single combining lens 650 immediately after the retarder stack filters 670. The resulting images from these architectures may not be as uniform as the architecture 600 of FIG. 6, but it translates into reduced parts count and cost savings. Certain imaging techniques may also help with parts-count reduction, such as using one or more lenses placed off-center from the light sources. The elements that remain then would be at least the multiple-colored monochromatic-unpolarized light sources with PBSs and retarder stacks. The goal is to make the light polarized, homogenous, and to avoid "throwing away" any of the source light.

Figure 10:
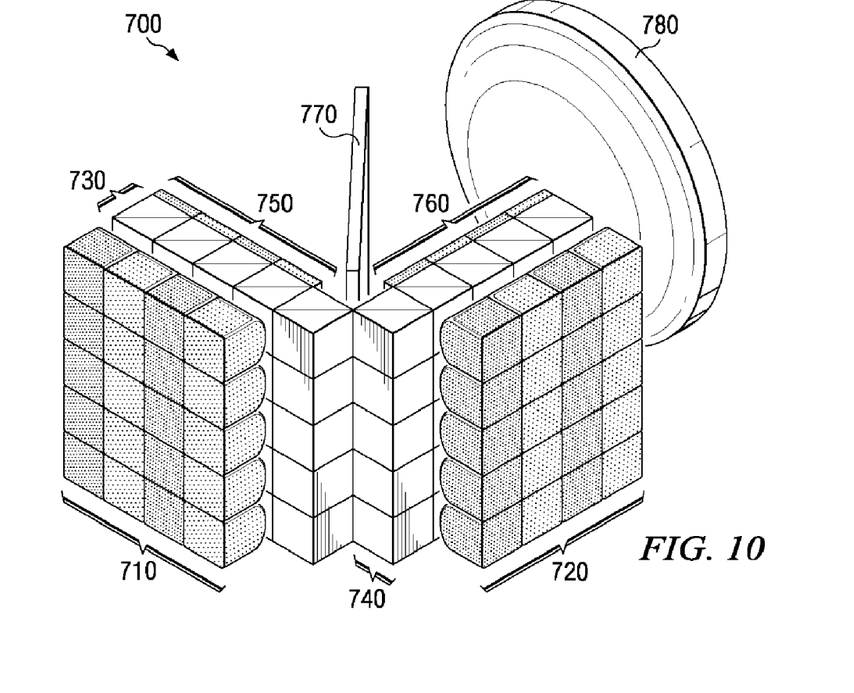
FIG. 10 illustrates a four-color illumination architecture with arrays of LEDs, PBSs, filters, a dichroic mirror, and a single collimating lens.

FIG. 10 illustrates a three-dimensional view of an illumination architecture 700 with four-colored light sources. Two sets of LED arrays 710, 720 are provided with each set having two different colors in alternating columns. The light beams may be separated according to polarization and uniformly polarized by passing through the PBS arrays 730, 740 and alternating columns of retarder stack filters 750, 760. A dichroic beam combiner 770 is provided to reflect the emerging blue/green light and to transmit the emerging red/yellow light. The alternating columns of retarder stack filters 750, 760 may uniformly polarize these beams of light as previously described. In the present example, due to possible advantages in the dichroic filter 770 design, the red and yellow LEDs 710 are grouped together, and the green and blue LEDs 720 are grouped together. This provides a single transition in the dichroic wavelength division rather than the alternating transitions that would be required if the non-adjacent wavelengths were not grouped together as shown here. In other embodiments, non-adjacent spectrum LED colors may also be paired together. For example, red with green and yellow with blue. In either case, as before, a single collimating lens 780 is provided here at the output of the architecture 700.

Figure 11:
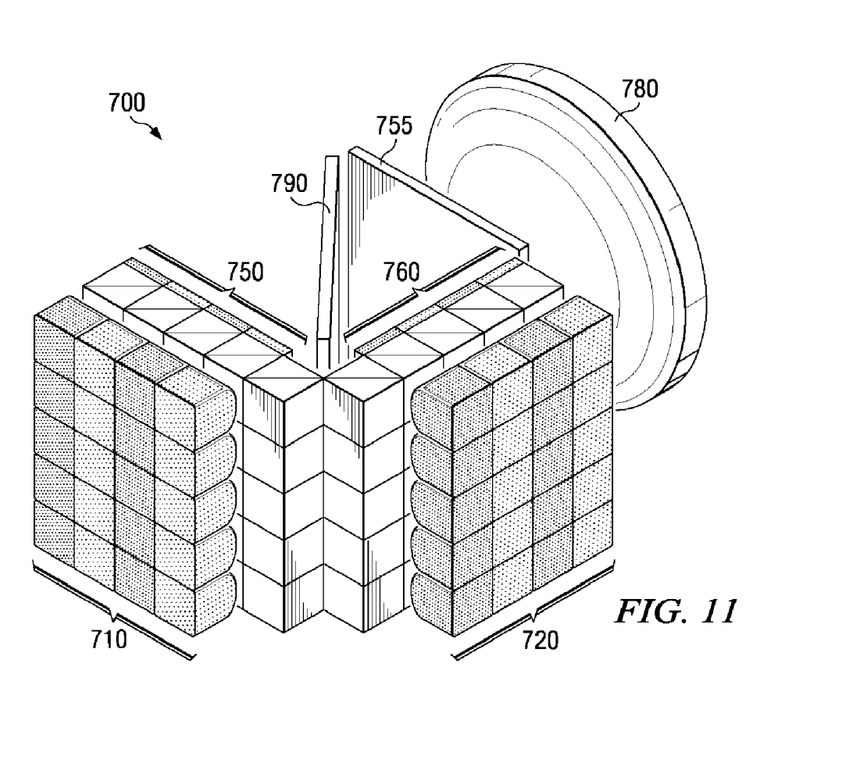
FIG. 11 illustrates the architecture of FIG. 10 incorporating a color select filter.

FIG. 11 illustrates the architecture 700 of FIG. 10 with a PBS 790 and a sheet retarder stack filter 755 in place of the dichroic filter 770 in redirecting the orthogonal light beams along the same direction. In this embodiment, the alternating retarder stack columns 750 are associated with the red-and-green LED array 710, and are designed to impart a p-polarization from the light beam comprising those colors, whereas the retarder stack columns 760 are associated with the yellow-and-blue LED array 720, and are designed to impart an s-polarization from the light beam comprising those colors. In doing so, the orthogonal light beams will both be directed along a common path toward the sheet retarder stack filter 755, which will then in turn rotate the polarization of either the blue and yellow light or of the red and green light, so that the light at the collimating lens 780 will have a common polarization. This embodiment groups the red and green LEDs in the same array 710 and the yellow and blue LEDs in another array 720 without having to use a complex dichroic filter 770.

Figure 12:
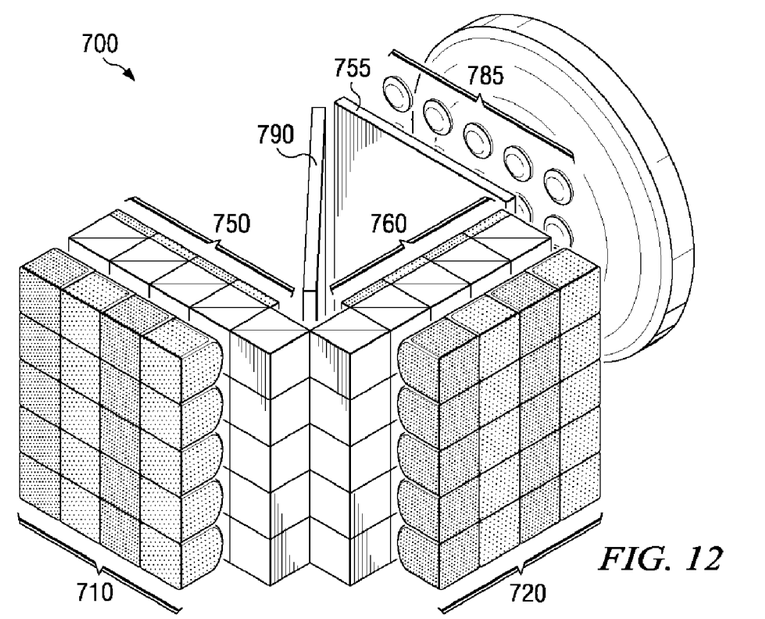
FIG. 12 illustrates the architecture of FIG. 10 incorporating a color select filter and a set of fly's eye lens.

FIG. 12 illustrates the architecture of FIG. 10 with a PBS 790, a sheet retarder stack filter 755, and a set of fly's eye lens array 785 in place of the dichroic filter 770 in redirecting the orthogonal light beams along the same direction. As shown, the fly's eye lens array 785 is interposed between the sheet retarder stack filter 755 and the collimating lens 780. The additional fly's eye lens array 785 makes the image brightness more uniform by imaging each of the individual pixels to the collimating lens 780.

Figure 13:
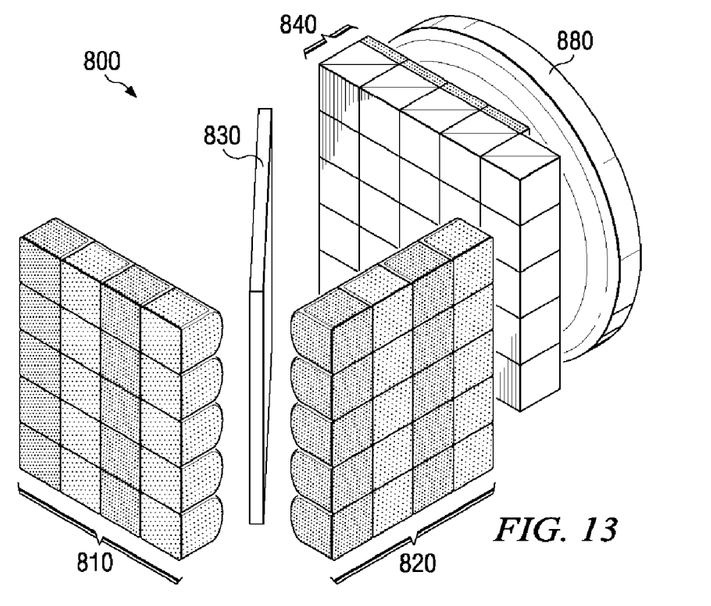
FIG. 13 illustrates the architecture of FIG. 10 incorporating different array orientations.

FIG. 13 illustrates a three-dimensional view of another illumination architecture 800, which provides polarization at the output before the collimating lens 880. The dichroic mirror 830 acts as a beam combiner to combine the images from the red/green array 810 with that of the blue/yellow array 820. At the output, instead of using a PBS array, a single PBS sheet 840 may be used, which may be less expensive. Not only is the PBS sheet 840 relatively inexpensive, using it dispenses with the necessity of having to align a PBS array with the sub-beamlets produced by the elements of the light source arrays 810, 820.

Figure 14:
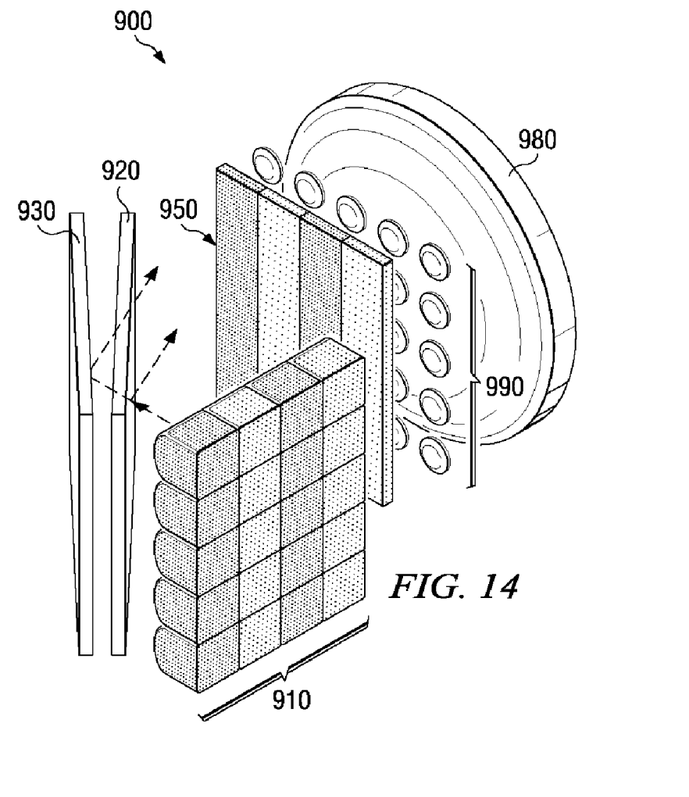
FIG. 14 illustrates a two-color illumination architecture with arrays of LEDs, filters, lenses, a PBS plate, a mirror, and a single collimating lens.

FIG. 14 illustrates a three-dimensional view of another color polarization and combination approach for two colors from an array of light sources 910. As with all of the above-described embodiments, while a particular two colors are illustrated as the light sources 910, the approach can be used to polarize and combine other colored light beamlets and for more than two colors. In this embodiment, the columns of blue and yellow light sources 910 within an array are emitted toward a PBS plate 920, which will separate the light into s-polarized (reflected) and p-polarized (transmitted) components. Behind the PBS plate 920 is a mirror 930, which will then reflect the p-polarized light that passed through the PBS plate 920, since the p-polarized light will also be transmitted through in the reflected direction. Therefore, the PBS film 920 first reflects the s-polarized light of either color, and the mirror 930 behind it reflects the rest, which is the p-polarized light, although as shown by the slightly different angle of the mirror 930 relative to the PBS plate 920, the s-polarized and p-polarized light beams will be at slightly different angles.

In general, and without particular reference to the above-described figures, if a great amount of optical power is placed in the integrated LED lenses (or associated with other types of light sources), then light from each lens can be resolved into a spot from each of the LEDs, roughly at the output collimating lenses 780, 880, 980 such as shown in FIGS. 11-14. In FIG. 14 in particular, the LED array 910 with its integrated lenses may produce a series of yellow spots and a series of blue spots (not shown). With the PBS plate 920 interposed in the light array, it will produce a spot array of one polarization near the output collimation lens 980. With the mirror 930 added in, it will produce another spot array of the other polarization, and the differential tilt of the mirror 930 relative to the PBS plate 920 will translate the spots of the other (p-) polarization. This translation can be arranged in order to effect alignment of p-polarized yellow with s-polarized blue and the alignment of s-polarized yellow with p-polarized blue. And as previously described, then, the retarder stack filter array 950 of alternating blue/yellow and yellow/blue filter columns may be used to re-align the polarizations of the superimposed light beams. This approach effectively produces a different way of homogenizing using a paired lens array.

Figure 15:
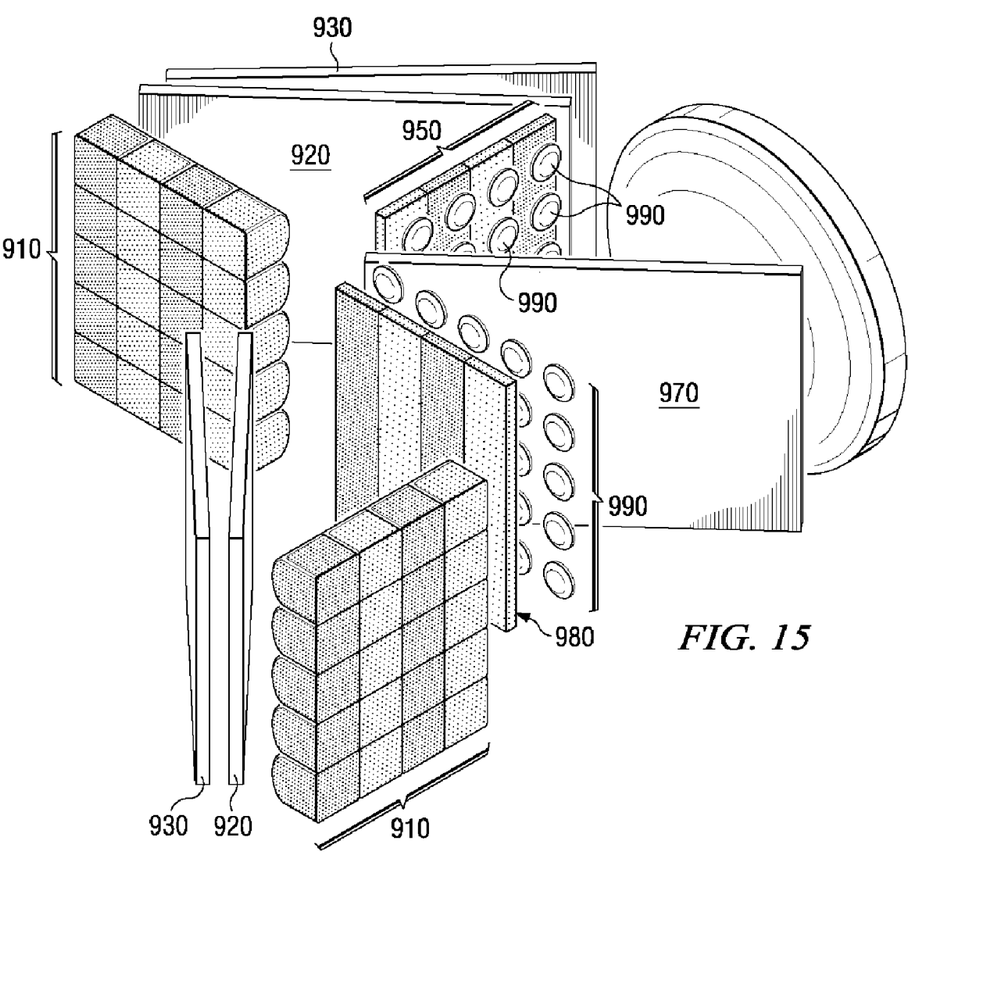
FIG. 15 illustrates a four-color illumination architecture with arrays of LEDs, filters, lenses, two PBS plates, two mirrors, a dichroic element, and a single collimating lens.

FIG. 15 represents the approach shown in FIG. 14, but effectively combines two such arrangements to net a four-color light source approach, where the yellow-and-blue light is combined with the green-and-red light through the dichroic element 970 after the two light beams have already been homogenized using their own respective sets of retarder stack filters 950 and fly's eye lenses 990.

Figure 16:
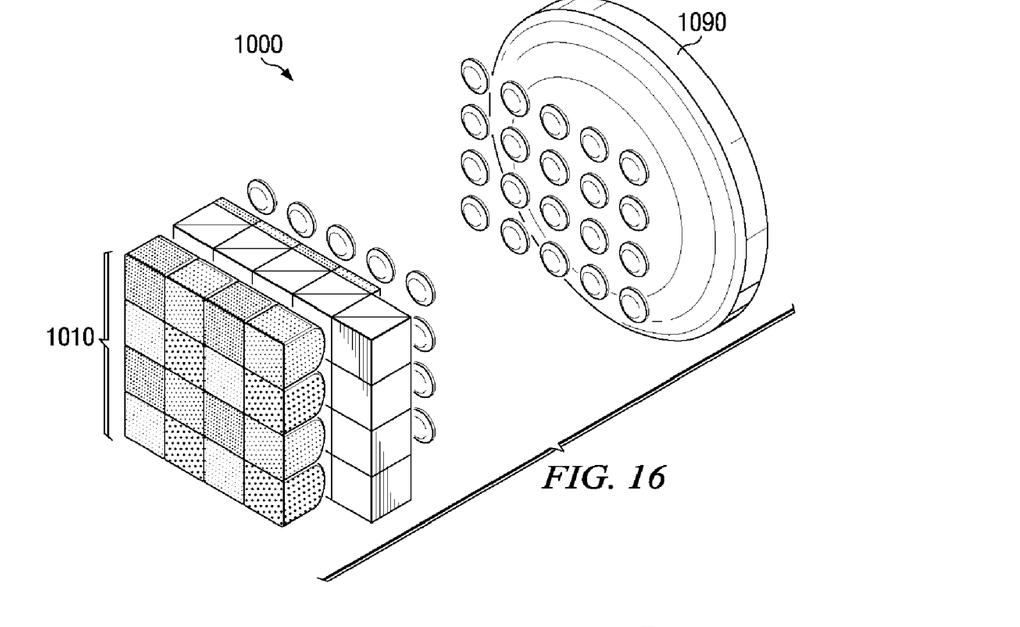
FIG. 16 illustrates a four-color illumination architecture with arrays of LEDs, PBSs, filters, and lenses.
Figure 17:
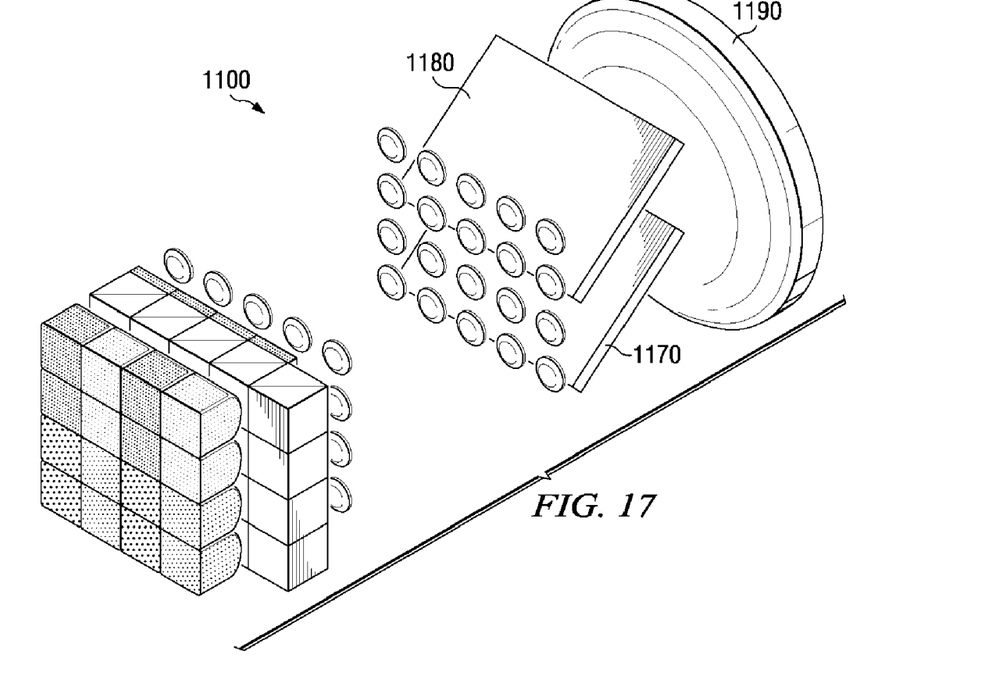
FIG. 17 illustrates the architecture of FIG. 16 incorporating a mirror and a dichroic filter.

Further embodiments described in FIGS. 16-17 relate to matching the size of the combined light sources to the optical components that use the output of the combined light sources. This principle is sometimes described in the art as optimizing a system's "etendue," which is a term of art defined, for example, in the Photonics Directory (available at http://www.photonics.com/dictionary/lookup/XQ/ASP/url.lookup/entrynum.1 735/pu/letter.e/QX/lookup.htm) as, "A product of the area of a light beam (normal to its direction of propagation) and the solid angle that the beam includes; flux per unit radiance or luminance. Alternative terms: geometric extent, throughput."

From an efficiency standpoint, a preferred embodiment is to avoid having a combined light source that is larger in area than the target optical system can handle. Additionally, another preferred embodiment is to want that combined light source to completely fill the light path of the target optical system, typically with the greatest light power possible.

FIG. 16 illustrates an approach in which four colors are combined into a single array 1010, and in which adjacent columns are combined using a linear PBS array. This approach, however, doubles the etendue in that there will be alternating rows of red/green and blue/yellow light. Thus, the area is twice what it would be if all the colors were combined in the system 1000 to pass finally through the same optical elements within the same area. Although superficially it would seem that etendue would be preserved, in that the combining lens 1090 will combine the light into a single beam, the various colors that were not superimposed by the linear PBS array may have differing angles and so therefore the etendue will not be preserved under this approach, since the size of an optical beam is the product of its physical size and its angle of convergence/divergence.

FIG. 17, in contrast to FIG. 16, preserves the etendue by using a dichroic filter 1180 and a mirror 1170 to vertically combine the separate groups of rows bearing the two separate pairs of color—yellow/red and blue/green, before passing the light into a combining lens 1190 at the output of the system 1100.

Although the above systems have been described in terms of light projection, they can be applied in contexts outside of projection where light polarization or homogenization is useful. For example, a properly designed homogenization system using the above-described systems and architectures could be used to provide a polarized edge illumination for an LCD flat-panel display in a way to help provide a more efficient light, where most of the light would be properly passed—polarized—through the input-side polarizer.

Figure 18:
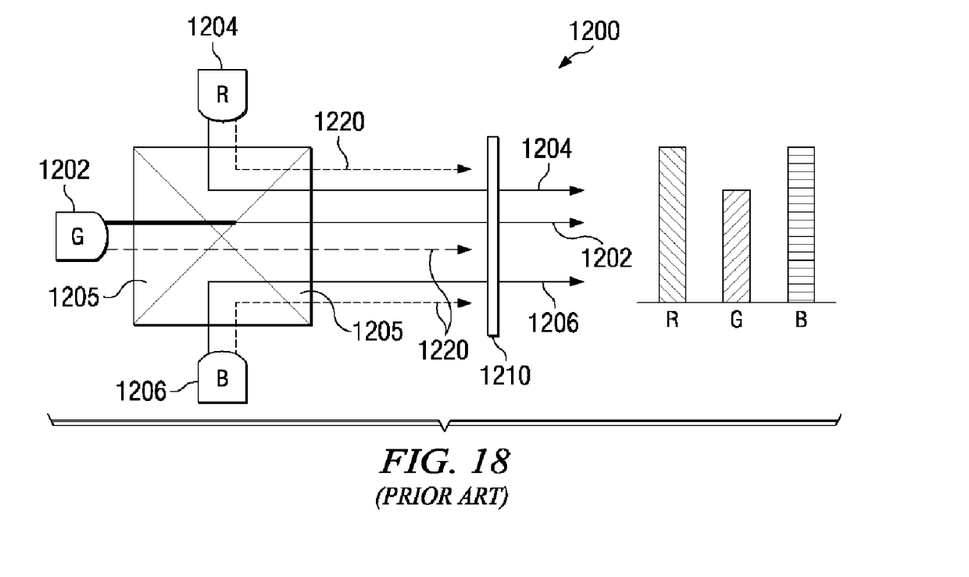
FIG. 18 illustrates a prior-art X-cube architecture with a s-polarizer.
Figure 19:
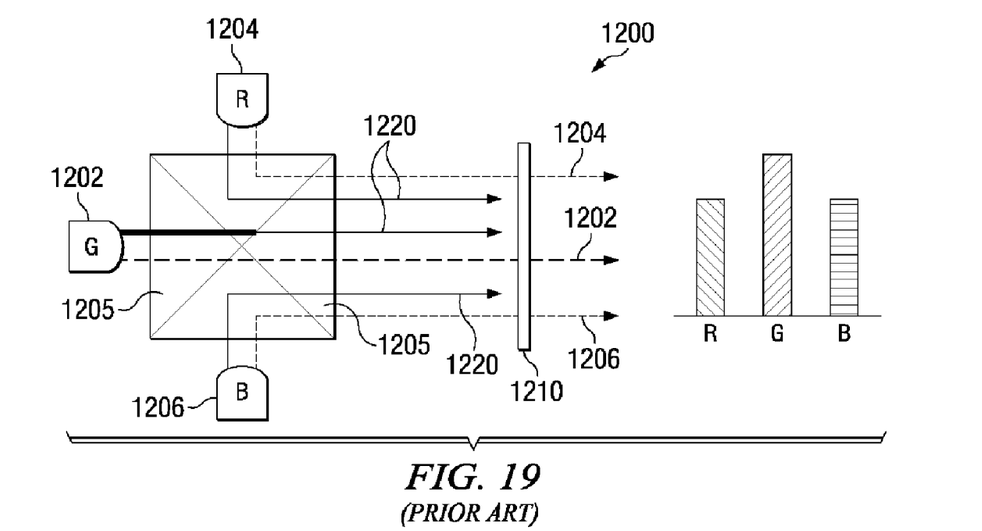
FIG. 19 illustrates a prior-art X-cube architecture with a p-polarizer.
Figure 20:
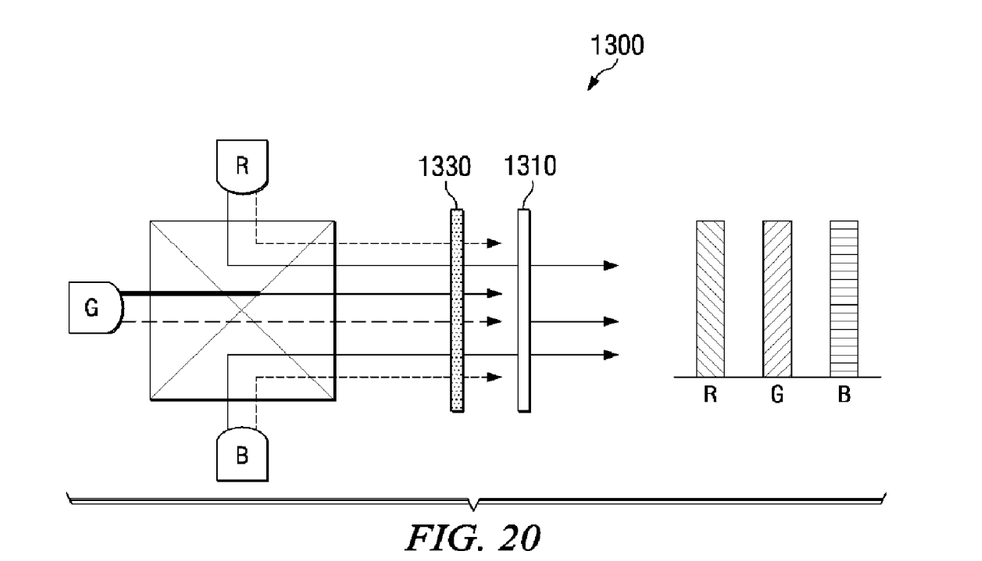
FIG. 20 illustrates an X-cube architecture embodiment with a color select filter and a s-polarizer.

FIGS. 18-20 provide a way of using LED or other monochromatic input sources within an X-cube architecture. The X-cube is typically a dichroic splitter in an "X"-shaped configuration, and it is a component that's often used in projection system. Due to the nature of dichroic filters as also having generally undesirable polarization-based performance, whereas in a PBS the p-polarized light is more efficiently transmitted and the s-polarized light is more efficiently reflected, the most efficient way to use the illustrated X-cube configuration is to have the green light entering the system be p-polarized and to have the red and blue lights be s-polarized.

FIGS. 18-19 illustrate the inefficiency inherent in the X-cube approach, where the monochromatic light sources are also unpolarized light sources. FIG. 18 shows a prior-art configuration 1200 with an s-polarizer 1210 at the output, where the p-polarization of the three incident light beams 1220 are discarded. In this instance, because of the relative inefficiency in the system's 1200 handling of the green light, which is transmitted through the two dichroic filters 1205 thereby reducing the available s-polarized green light, the green light 1202 will be reduced relative to the red 1204 and blue 1206 lights, which only pass through a single dichroic element interface 1205. FIG. 19, in contrast, shows a prior-art configuration 1200 with a p-polarizer 1210 at the output, where the s-polarization of the three incident light beams 1220 are discarded. In this instance, because of the relative inefficiency in the system's 1200 handling of the red 1204 and blue 1206 lights, which may be reflected once through the two dichroic filters 1205 thereby losing some of their p-polarized components, while the p-polarized green light 1202 is transmitted through the two dichroic filters 1205 relatively unaffected.

FIG. 20 improves on the described approaches of FIGS. 18-19 by rotating selected wavelength's polarizations in order to maximize the light intensity transmitted through the s-polarizer 1310. A similar approach could be followed with a p-polarizer output 1310, and the characteristics of the retarder stack filter 1330 would then be adjusted in order to provide predominantly p-polarized light from all three colors.

It will be appreciated by those of ordinary skill in the art that the invention can be embodied in other specific forms without departing from the spirit or essential character thereof. For example, light pipes may be used in addition to fly's eye lenses or in some embodiments in place of those lenses in order to provide homogenization of the sub-beamlets. Other polarization recovery techniques may also be used in conjunction with the described embodiments. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An illumination system for receiving first and second input light sources, the first and second input light sources comprising first and second colors, respectively, the illumination system comprising:
    a polarizing beam splitter operable to receive the first input light source at a first input and the second input light source at a second input, and to split the two input light sources into first and second mixed lights, and to output the first mixed light at a first output and the second mixed light at a second output; and
    first and second optical filters adjacent to the first and second outputs, respectively, the first and second optical filters operable to selectively convert polarization states of the two mixed lights;
    wherein the first and second optical filters are retarder stack filters; and
    wherein the first and second optical filters are operable to convert the polarization state of light having a respective first wavelength while leaving unchanged the polarization state of light having a respective second wavelength, wherein the polarization state of light having the first respective wavelength is converted from a first polarization state to a second polarization state.

2. An illumination system according to claim 1, wherein the first and second mixed lights each comprises first and second colors.

3. An illumination system according to claim 1, further comprising collimating elements along the optic paths of the first and second input light sources, the collimating elements operable to substantially homogenize the first and second input light sources.

4. An illumination system according to claim 3, wherein the collimating elements are reflective or refractive optical elements.

5. An illumination system according to claim 1, wherein each of the first and second input light sources is operable to provide substantially square outputs of light.

6. An illumination system according to claim 1, wherein the retarder stack filters are multi-layered structures.

7. An illumination system according to claim 1, further comprising a light-reflecting element adjacent to the polarizing beam splitter, the light-reflecting element operable to substantially align the first and second mixed lights with each other.

8. An illumination system according to claim 7, wherein the light-reflecting element is a mirror.

9. An illumination system according to claim 7, further comprising an optical lens adjacent to the polarizing beam splitter and the light-reflecting element, the optical lens operable to project the two substantially aligned mixed lights.

10. A method for splitting first and second input light sources in an illumination system, the method comprising:
providing a polarizing beam splitter;
receiving first and second input light sources with the polarizing beam splitter at first and second inputs, respectively;
splitting the first and second input light sources into first and second mixed lights with the polarizing beam splitter;
outputting the first mixed light at a first output;
outputting the second mixed light at a second output;
providing first and second optical filters adjacent to the first and second outputs, respectively, the first and second optical filters being retarder stack filters that are each operable to convert the polarization state of light having a respective first wavelength while leaving unchanged the polarization state of light having a respective second wavelength, wherein the polarization state of light having the first respective wavelength is converted from a first polarization state to a second polarization state; and
selectively converting polarization states of the first and second mixed lights having the respective first wavelengths with the first and second optical filters, respectively.

11. A method according to claim 10, wherein the first and second mixed lights each comprises first and second colors.

12. A method according to claim 10, further comprising substantially homogenizing the first and second input light sources with collimating elements along the optic paths of the first and second input light sources.

13. A method according to claim 12, wherein the collimating elements are reflective or refractive optical elements.

14. A method according to claim 10, wherein each of the first and second input light sources is operable to provide substantially square outputs of light.

15. A method according to claim 10, wherein the retarder stack filters are multi-layered structures.

16. A method according to claim 10, further comprising substantially aligning the first and second mixed lights with each other using a light-reflecting element adjacent to the polarizing beam splitter.

17. A method according to claim 16, wherein the light-reflecting element is a mirror.

18. A method according to claim 16, further comprising projecting the two substantially aligned mixed lights with an optical lens adjacent to the polarizing beam splitters.

19. An illumination system for receiving first and second input light sources, the first and second input light sources comprising first and second colors, respectively, the illumination system comprising:
a polarizing beam splitter operable to receive the first input light source at a first input and the second input light source at a second input, and to split the two input light sources into first and second mixed lights, and to output the first mixed light at a first output and the second mixed light at a second output; and
first and second optical filters adjacent to the first and second outputs, respectively, the first and second optical filters operable to selectively convert polarization states of the first and second mixed lights relative to wavelength ranges of the first and second outputs,
wherein the first and second optical filters are operable to convert the polarization state of light having a respective first wavelength while leaving unchanged the polarization state of light having a respective second wavelength, wherein the polarization state of light having the first respective wavelength is converted from a first polarization state to a second polarization state.

20. A method for splitting first and second input light sources in an illumination system, the method comprising:
providing a polarizing beam splitter;
receiving first and second input light sources with the polarizing beam splitter at first and second inputs, respectively;
splitting the first and second input light sources into first and second mixed lights with the polarizing beam splitter;
outputting the first mixed light at a first output;
outputting the second mixed light at a second output;
providing first and second optical filters adjacent to the first and second outputs, respectively, the first and second optical filters being retarder stack filters, and at least one of the first and second optical filters being operable to convert the polarization state of light having a first wavelength while leaving unchanged the polarization state of light having a second wavelength, wherein the polarization state of light having the first wavelength is converted from a first polarization state to a second polarization state; and
selectively converting polarization states of the first and second mixed lights with the first and second optical filters relative to wavelength ranges of the first and second mixed lights, respectively.

* * * * *